(12) United States Patent
Rai et al.

(10) Patent No.: US 10,574,521 B2
(45) Date of Patent: Feb. 25, 2020

(54) METHOD AND APPARATUS TO PREDICT CONFIGURATION VIABILITY AND DYNAMICALLY MANAGE MULTI-DIMENSIONAL SYSTEM SCALE IN MSDC SWITCHES

(71) Applicant: Cisco Technology, Inc., San Jose, CA (US)

(72) Inventors: Pankaj Kumar Rai, San Jose, CA (US); Shrawan Chittoor Surender, Sunnyvale, CA (US); Srinivas Pitta, Cupertino, CA (US); Siddartha Gundeti, San Ramon, CA (US); Narayanaswami Ganapathy, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 85 days.

(21) Appl. No.: 15/644,992

(22) Filed: Jul. 10, 2017

(65) Prior Publication Data

US 2018/0367385 A1 Dec. 20, 2018

Related U.S. Application Data

(60) Provisional application No. 62/521,650, filed on Jun. 19, 2017.

(51) Int. Cl.
*H04L 12/24* (2006.01)
(52) U.S. Cl.
CPC ...... *H04L 41/0816* (2013.01); *H04L 41/0853* (2013.01); *H04L 41/0869* (2013.01); *H04L 41/0873* (2013.01); *H04L 41/0876* (2013.01)

(58) Field of Classification Search
CPC ......... H04L 41/22; H04L 29/06; H04L 45/50; H04L 69/18; H04L 7/0008; H04L 41/082; H04L 41/0856; H04L 41/0803; H04L 63/102; H04L 41/0213; H04L 41/0893; H04L 63/105; H04L 41/0672; H04L 41/0806; H04L 41/0843; H04L 43/16; H04L 41/0681; H04L 41/085; H04L 41/0859; H04L 41/0863
USPC ....................................................... 370/254
See application file for complete search history.

(56) References Cited

U.S. PATENT DOCUMENTS 5,978,896 A * 11/1999 Kahle .................. G06F 9/3802
712/200
6,263,364 B1 * 7/2001 Najork ............. G06F 17/30864
707/E17.108
6,336,135 B1 * 1/2002 Niblett .................... G06F 9/541
707/E17.001

(Continued)

*Primary Examiner* — Natasha W Cosme
(74) *Attorney, Agent, or Firm* — Merchant & Gould P.C.

(57) ABSTRACT

Methods and systems for configuring a local switch and a remote switch configured as peers. The method includes: receiving a configuration for configuring the local switch and the remote switch; checking if resources are available for the configuration on the local switch; when resources are available on the local switch, reserving those resources; checking if resources are available for the configuration of the remote switch; when resources are available on the remote switch, reserving those resources; and applying the configuration to the local switch and the remote switch when resources are available on the local switch and the remote switch.

19 Claims, 5 Drawing Sheets

(56) References Cited

U.S. PATENT DOCUMENTS

2003/0179703 A1\* 9/2003 Levy ................ H04L 41/06
                                              370/230
2011/0103259 A1\* 5/2011 Aybay ............... H04L 49/35
                                              370/254

\* cited by examiner

METHOD AND APPARATUS TO PREDICT CONFIGURATION VIABILITY AND DYNAMICALLY MANAGE MULTI-DIMENSIONAL SYSTEM SCALE IN MSDC SWITCHES

RELATED APPLICATION

Under provisions of 35 U.S.C. § 119(e), Applicant claims the benefit of U.S. Provisional Application No. 62/521,650 filed Jun. 19, 2017, which is incorporated herein by reference.

TECHNICAL FIELD

This disclosure relates in general to programming switches and, more particularly, to predicting configuration viability of switches and managing configuration of switches in a massively scalable data center.

BACKGROUND

In today's market, there is an increasing focus to install massively scalable data centers (MSDC) and configure them through automated orchestration. A controller may need to configure huge numbers of switches in an MSDC. In such a case, it could dump the entire configuration onto a switch and let the switch respond back when the entire configuration is accepted. However, present switch operating systems don't know if a given/proposed configuration or interface event can be successfully accepted by the hardware on the switch. This is even more the case in a virtual Port-channel ("vPC") scenario where a configuration must be accepted as a success only when it goes successfully into hardware in both vPC peer switches.

Another problem is unpredictable bursts of system load. This can happen because of any system level trigger, i.e., reload of this switch or peers needing to be reloaded, or vPC peer-link shut/no shut. These may cause a number of physical/logical interfaces to flap. A number of interfaces generating concurrent resource-consuming events like LINK_UP too can cause unusual system load due to bringing up a number of interfaces in a short span of time.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Methods and systems for configuring a local switch and a remote switch configured as peers are provided. The method includes: receiving a configuration for configuring the local switch and the remote switch; checking if resources are available for the configuration on the local switch; when resources are available on the local switch, reserving those resources; checking if resources are available for the configuration of the remote switch; when resources are available on the remote switch, reserving those resources; and applying the configuration to the local switch and the remote switch when resources are available on the local switch and the remote switch.

Further disclosed is a method for configuring a switch, including: receiving a configuration file comprising the configurations for a plurality of apps; determining the resource needs of each of the plurality of apps; queuing in a queue the plurality of apps for execution based on the resource needs of each of the plurality of apps; and starting each of the plurality of apps according to the queue.

Also disclosed is a system for configuring a switch, including a processor; and a memory storage device for storing instructions coupled to the processor. The processor is responsive to the instructions of the program, and operable for: receiving a configuration file comprising the configurations for a plurality of apps; determining the resource needs of each of the plurality of apps; queuing the plurality of apps for execution based on the resource needs of each of the plurality of apps; and starting each of the plurality of apps according to the queue.

Example Embodiments

The above scenarios in expanding cloud network architectures and the MSDC world can lead to high user dissatisfaction, especially as the number of high density line cards increases. From a customer perspective, uncontrolled execution of scale events can result in system or hardware failure. The present disclosure can apply configurations which can reduce overwhelming the hardware capacity and fail.

With increasing port density and more flexible programmability, the switch is being abstracted out. In such cases, management and prediction of configurations is very much important. The present disclosure, given the ever increasing amount of physical (ethernet) and logical (SI, VSI etc.) interfaces and configurations, may address one or more of the following issues: speed and stability of the system for handling scale events, such as switch reload, switch bootup, and peer link flap; and the ability to predict if a configuration can be successfully applied within the switch and across the switches.

The present disclosure provides several benefits over previous system and methods: it is distributed; it is dynamic; and it provides scale configuration viability protection. Being distributed, there may be multiple compute nodes in system; each Line Card (LC) may be one independent compute node; parallelism may be achieved by creating multiple input queues, one per LC. Being dynamic, it permits feedback from the line card; it may collect the programming time and resource information for each port on the LC; it may report the configuration of each port; and, it may use the above information to determine the capability of each LC and feedback this data for future triggers. Regarding scale configuration viability prediction, this provides that: Line Cards may collect and report resource usage for each type of resource; the application may store and track used and provisioned hardware resources; the application matches hardware usage with the amount of configuration requested; the generation of a prediction matrix for each configuration type; and the checking of the viability of a new configuration against benchmarks.

Figure 1:
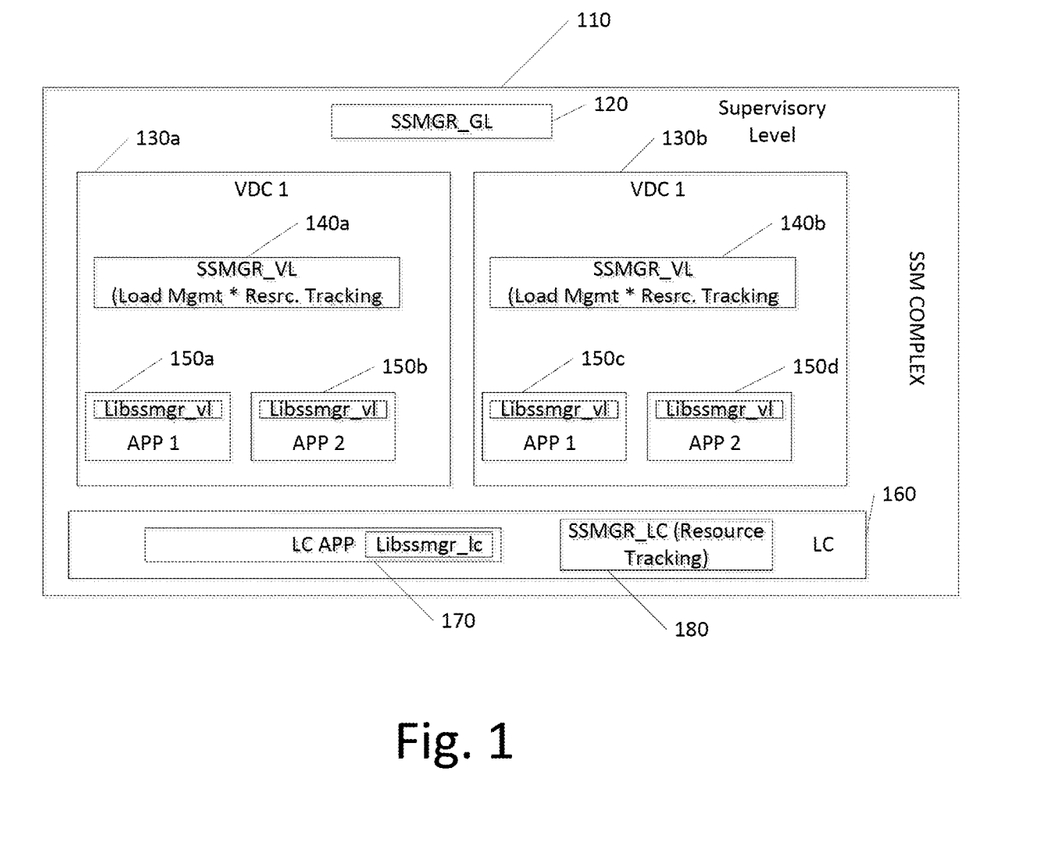
FIG. 1 illustrates an exemplary software architecture for use in implementing a system scale management ("SSM") software architecture consistent with the principles of the present disclosure.

FIG. 1 illustrates an exemplary software architecture for use in implementing a system scale management ("SSM") software architecture consistent with the principles of the present disclosure. The full SSM management software architecture 110 comprises a number of scale managers and scale manager libraries. SSMGR_GL 120 is the global level system scale manager. SSMGR_VL 140a and 140b reside in each respective virtual data center ("VDC") 130a and 130b. Libssmgr_vl 150a-d is a VDS local level scale manager library used by different applications. The LC 160 includes an SSMGR_LC 180 for resource tracking and the LC App 170 contains a library Libssmger_lc. Among these components, they comprise a system with VDC-level knowledge for better scale management across VDC and system-level resources. Central bottlenecks are reduced, and there is a division of load to the various VDC's. These systems also provide for resource tracking at both the LC level and the supervisory level. Queues for the various components may be maintained in the various libraries listed above.

The above system may track the unit configuration hardware resources for each configuration type, e.g., vlan and access control lists ("ACL"). The above components also may track the unit configuration programming time for each type of configuration. The programming load may be controlled based on line card capacity, and the port programming may be parallelized by distributing the work effectively to all of the affected LC's. The incoming load may also be shaped according to the capacity of the supervisory level or the LC. It may be buffered at at least three levels: the application itself, the VDC level, or at the supervisory level. The above components may also provide queuing and releasing of the system load based on static heuristic approaches or a dynamic profiling/statistics based approach. In other words, this can be an open loop system where static LC performance is known in advance, or the system can learn the performance of programming the line cards based on feedback from the LC's themselves to the system. The use of a distributed system approach above, i.e., sets of components comprising servers processes and libraries, that are present across the supervisory level and the LC's can predict and manage multi-dimensional scale systems.

Using the above infrastructure, the disclosed solution helps to dynamically shape the load on a switch. When the controller dumps the configuration on a switch, it is shaped using the SSM complex, so the switch is able to manage this load efficiently and also predict where a configuration is viable or when a configuration is viable.

Figure 2:
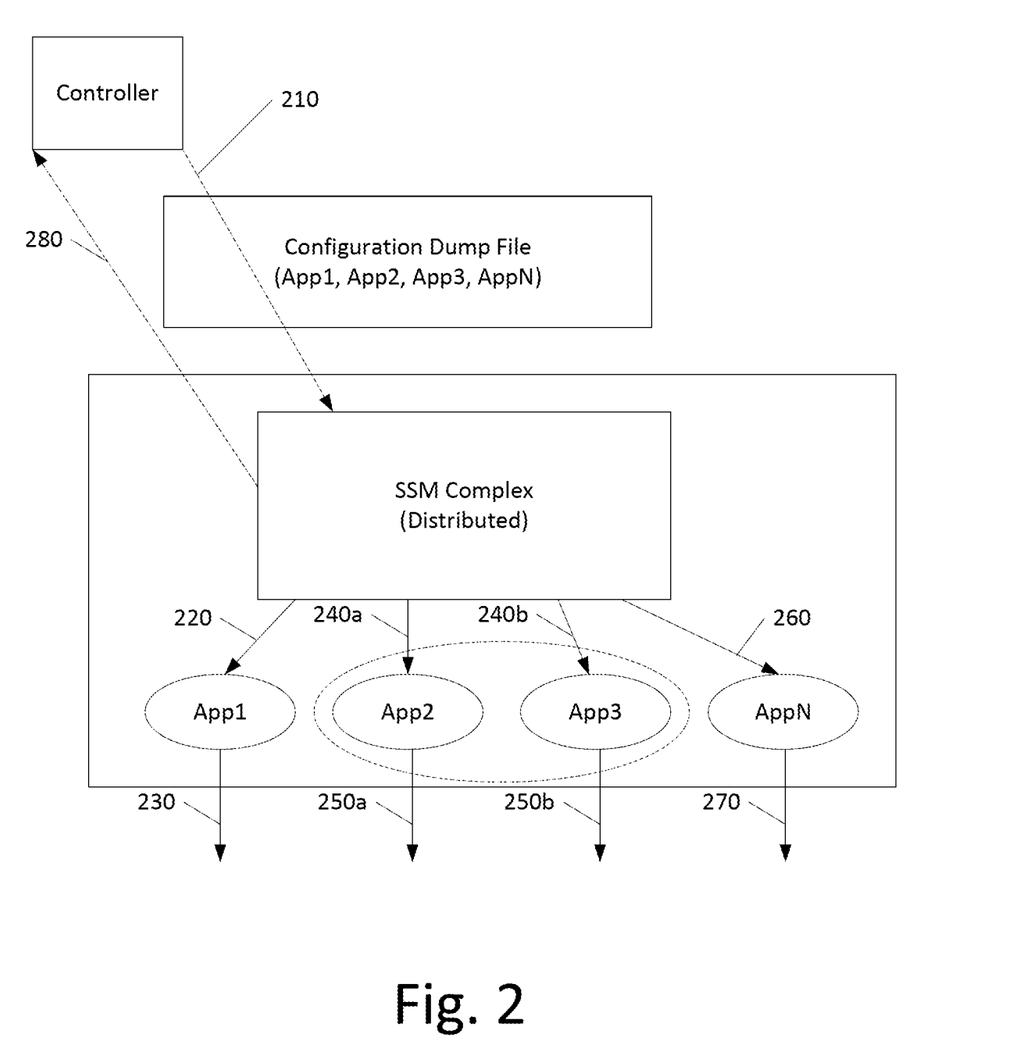
FIG. 2 illustrates an exemplary embodiment of a single switch configuration consistent with embodiments of the present disclosure.

FIG. 2 illustrates an exemplary embodiment of a single switch configuration consistent with embodiments of the present disclosure. When a CLI/Controller request comes in, it is either directed by component towards the SSM Complex or directly handled by the SSM Complex (for batched configuration dump from a controller). Since the SSM complex is tracking the resources within the system and is able to shape the system load, it will either grant the request or queue it based on the current load of the system. Once the grant happens, the component can go ahead with getting the configuration hardware, and it is highly likely that this configuration will go through. This queuing helps in shaping the load on the system to the levels that can be handled by the software processes/protocols. Furthermore, there could be some configuration which the current hardware resources cannot satisfy. In such a case, SSM is able to determine this ahead of time and sends a non-acceptance back as a response.

In FIG. 2, a control input 210 comes into the system and the configuration dump file (showing configurations for App1, App2, App3, and AppN) are read. The system knows the load required by App1, so initially only grants App1 permission to proceed at 220. App1 proceeds to program the hardware at 230. Next, the system knows that App2 and App3 require a lighter load, so the system proceeds to enable App2 and App3 to proceed in parallel at 240 and App2 and App3 program the hardware at 250. Next, the system knows that AppN requires more load on the system, so AppN is activated at 260 with a grant and it proceeds to configure any necessary hardware or software at 270.

Figure 3:
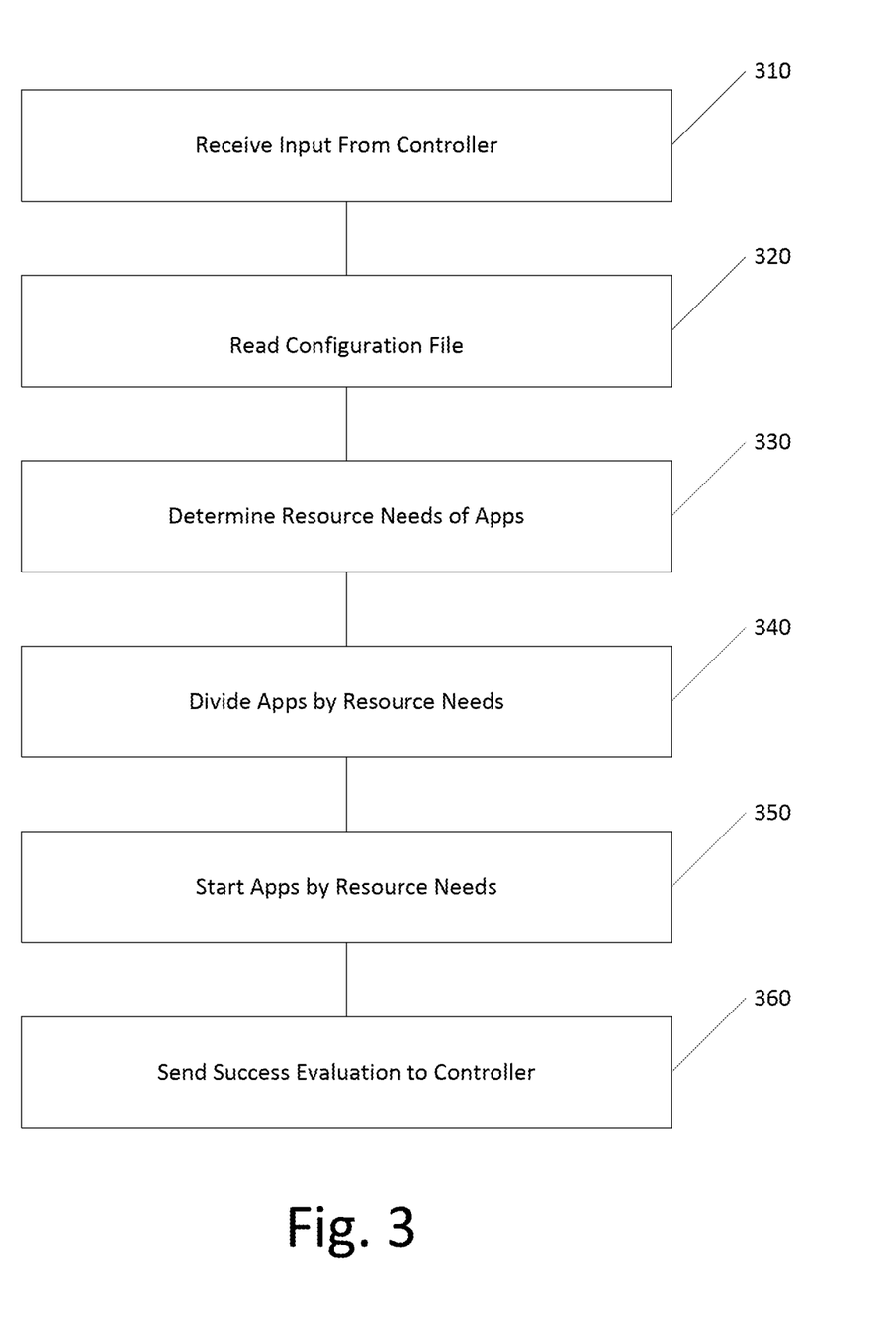
FIG. 3 is a flow chart of an exemplary embodiment for the single switch configuration illustrated in FIG. 2 consistent with embodiments of the present disclosure.

FIG. 3 is a flow chart of an exemplary embodiment for the single switch configuration illustrated in FIG. 2 consistent with embodiments of the present disclosure. Input is received from the controller or command line interface ("CLI") (stage 310). The configuration file of apps to be enabled is read (stage 320). The resource needs of the apps is determined (stage 330), and the resource needs of the apps determine the order and parallelism that can be achieved (stage 340). Based on the resource needs of the apps, the apps are started in a combination of serial/parallel provisions (stage 350). Finally, confirmation of a successful result is sent to the controller (stage 360). At each stage if a determination is made that hardware cannot fulfill the requirements needs, a grant may be denied and the controller or CLI may be notified.

Figure 4:
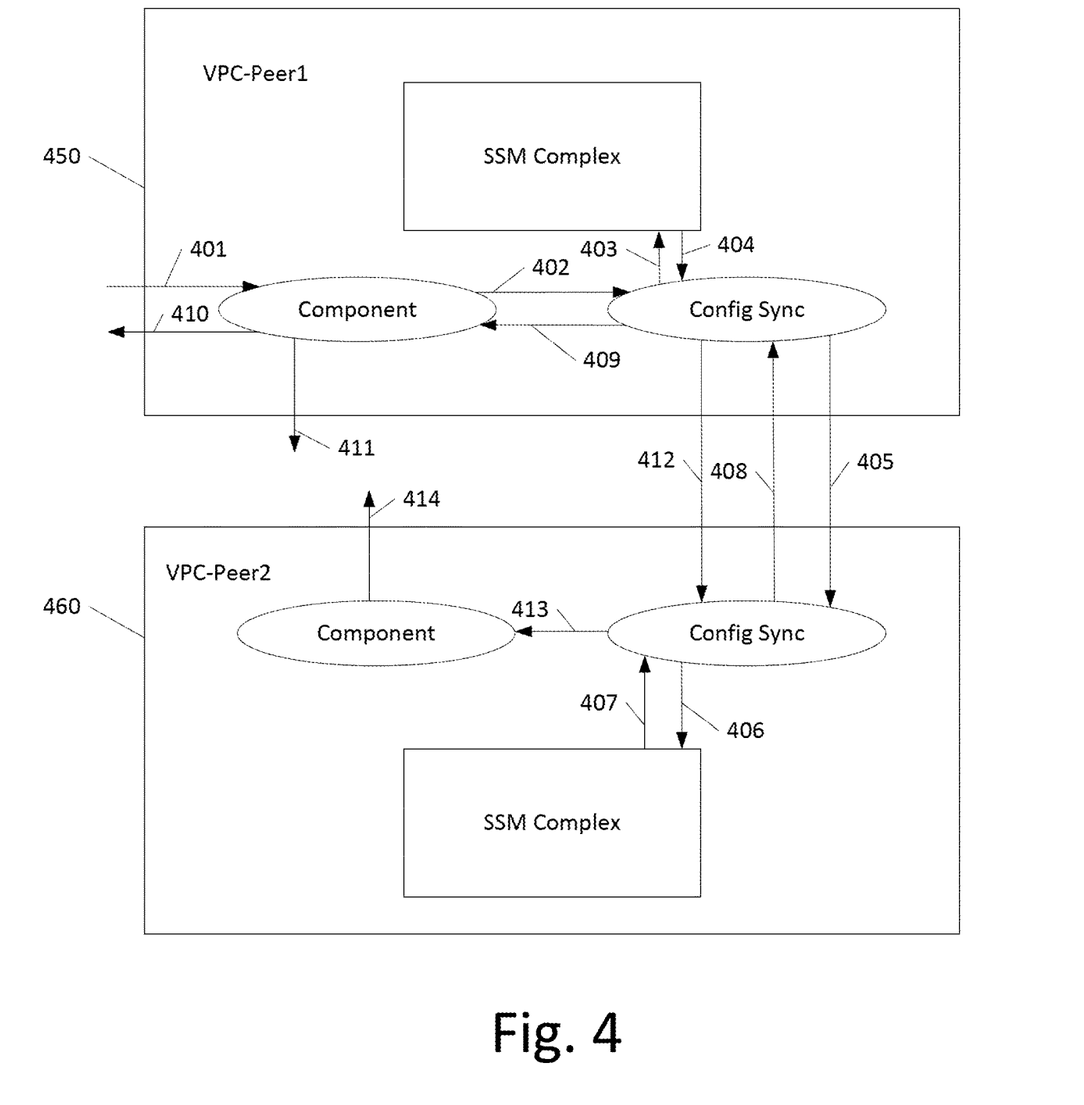
FIG. 4 is an exemplary embodiment of a vPC complex when the configuration needs to be run between two peers consistent with embodiment of the present disclosure.

FIG. 4 is an exemplary embodiment of a vPC complex when the configuration needs to be run between two peers consistent with embodiment of the present disclosure. Prior to this disclosure, in a vPC complex, when the configuration needs to sync between both the peers, it is not possible to know if the remote end is also able to accept it. This could lead to inconsistencies in the configuration and hence issues. With the help of the disclosed SSM complex, this problem is being solved by the use of a Verify/Reserve/Commit Protocol. The complete protocol operation is depicted in FIG. 4 but stages 401 through 414 are first summarized below.

When a new configuration is applied on a vPC interface the following stages occur. The SSM Complex will check if this configuration can be successfully applied on this local switch. The VPC-Peer1 Config Sync component will communicate with the remote VPC-Peer2 Config Sync. The remote VPC-Peer2 Config Sync component talks to its SSM Complex to verify and reserve the applicability of configuration. If the remote VPC-Peer2 SSM Complex also confirms acceptance, then this configuration will be accepted at both peers. This will make sure that the commit of this new configuration to the remote and local VPC peer is always successful.

Overall, with the help of the above architecture, the system will keep track of the current resource usage. Whenever a user applies a configuration to an interface, this mechanism will check that enough hardware resources are available to take this configuration. Application/Component (owning a particular hardware resource) will update the hardware resource usage figure as if this configuration is already programmed. This will allow the component to accurately predict it for each configuration application.

In case of a scaled trigger, each interface owning component will keep track and interface bringing up requests through the mechanism shown in FIG. 1 above. These components will keep track of the programming load on line cards and parallelize the port programming across the affected LC's. Since each LC running in parallel, this may reduce the total programming time.

Turning to the details of FIG. 4, at 401 an input is received from a controller or a command line interface (401). This is transferred to the Configuration Sync (402). The Configuration Sync checks with its local SSM Complex to verify that the resources are available and reserve the resources (403). At 404, a grant is received from the SSM Complex to proceed. At 405, a remote command to update vPC-Peer2 460 is transferred to Configuration Sync of VPC-Peer2 460. At this point, vPC-Peer2 460 checks with its local SSM Complex to see if resources are available and reserve those resources (406). The reservation and verification of resources is acknowledged from the SSM Complex at vPC-Peer2 460 to the Configuration Sync of vPC-Peer 2 460 at 407. At 408, vPC-Peer2 460 reports to vPC-Peer1 450 that the configuration is available and reserved. The Configuration Sync of vPC Peer1 450 receives this and provides a response to the Component of vPC-Peer1 450 at 409. Then, an accept response (or in the case of a failure to have sufficient resources available a fail response) is sent the controller or command line interface at 410. Then, local hardware at vPC-Peer 1 450 is committed and configured at 411. At 412, the Configuration Sync of vPC-Peer1 450 requests a Remote Commitment from vPC-Peer2 460. At 413, this commit is transferred to the component, and the remote hardware is committed and configured at 414.

Figure 5:
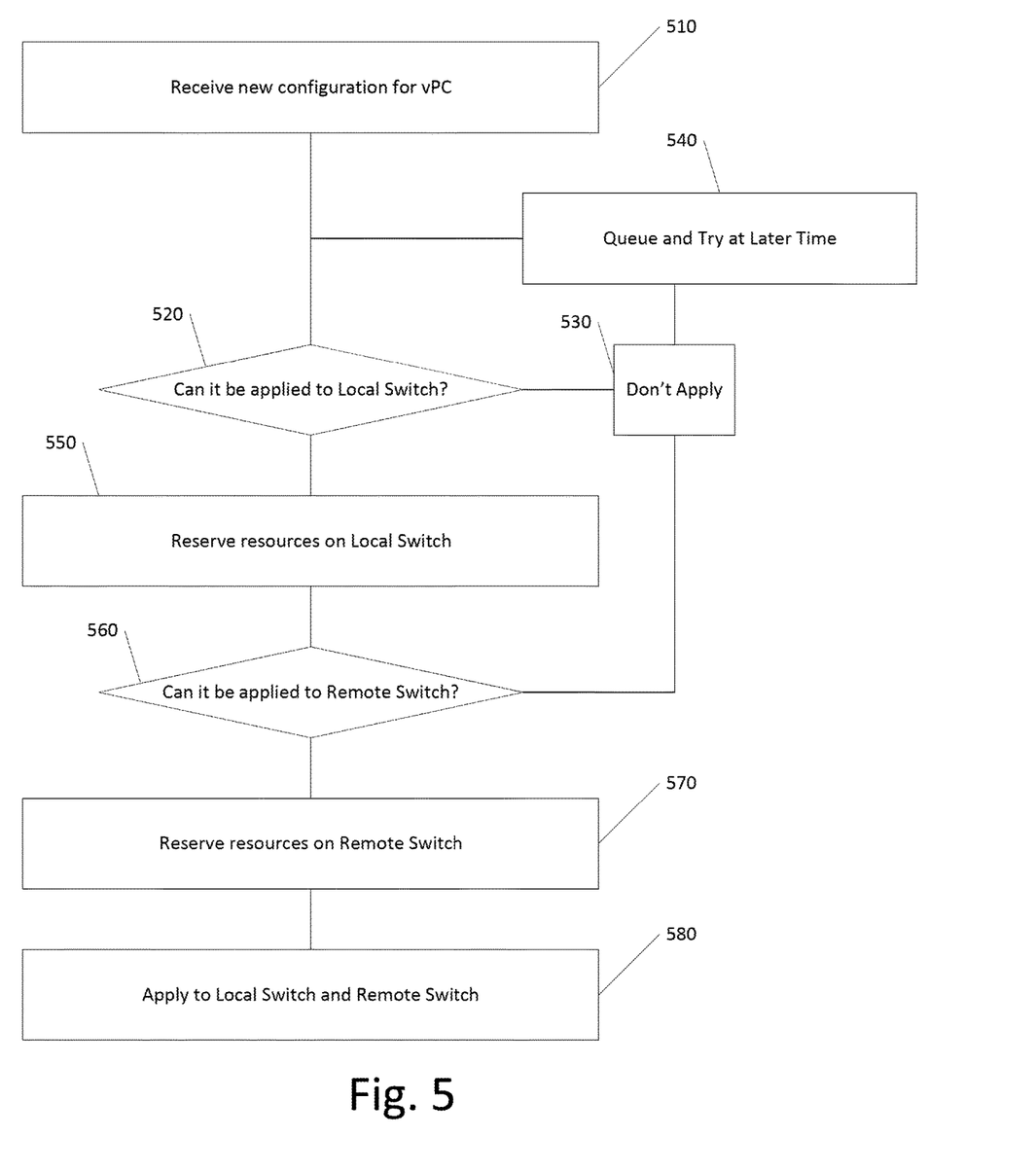
FIG. 5 is a flow chart of an exemplary embodiment for the vPC complex illustrated in FIG. 4 consistent with embodiments of the present disclosure.

FIG. 5 is a flow chart of an exemplary embodiment for the vPC complex illustrated in FIG. 4 consistent with embodiments of the present disclosure. A new configuration is received for a vPC from a CLI or a controller (stage 510). A check is made to see if this can be applied to the local switch (stage 520). If the required resources are unavailable at the local switch then the changes are not applied (stage 530), and the requested changes may be queued up for trying again at a later time with a failure notification optionally sent to the CLI or controller (stage 540). If the resources are available at the local switch, the resources are reserved at the local switch (stage 550).

A check is next made to see if the changes can be applied at the remote switch (stage 560). If not, flow continues to stage 530 where the changes are not applied. If so, resources are reserved at the remote switch (stage 570). Finally, the changes are applied at the local switch and the remote switch and a success indication may be sent to the CLI or controller (stage 580).

Any process, descriptions or blocks in flow charts or flow diagrams should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved. In some embodiments, steps of processes identified in FIGS. 3 and 5 using separate boxes can be combined. Further, the various steps in the flow diagrams illustrated in conjunction with the present disclosure are not limited to the architectures described above in association with the description for the flow diagram (as implemented in or by a particular module or logic) nor are the steps limited to the example embodiments described in the specification and associated with the figures of the present disclosure. In some embodiments, one or more steps may be added to the methods described in FIGS. 3 and 5 either in the beginning, end, and/or as intervening steps, and that in some embodiments, fewer steps may be implemented.

It should be emphasized that the above-described embodiments of the present disclosure are merely possible examples of implementations, merely set forth for a clear understanding of the principles of the switching systems and methods. Many variations and modifications may be made to the above-described embodiment(s) without departing substantially from the spirit and principles of the disclosure. Although all such modifications and variations are intended to be included herein within the scope of this disclosure and protected by the following claims, the following claims are not necessarily limited to the particular embodiments set out in the description.

We claim:

1. A method for configuring a switch, comprising:
receiving a configuration file comprising configurations for a plurality of apps;
determining resource needs of each of the plurality of apps;
queuing in a queue the plurality of apps for execution based on the resource needs of each of the plurality of apps, wherein queuing the plurality of apps for execution comprises:
determining, based on the resource needs of each of the plurality of apps and a system load, at least two of the plurality of apps that are to be executed in parallel,
determining an order of execution of the plurality of apps, and
queuing the plurality of apps in the queue for execution in the determined order, wherein queuing the plurality of apps comprises queuing the at least two of the plurality of apps for execution in parallel, and wherein queuing the plurality of apps for execution based on the resource needs of each of the plurality of apps comprises forming a plurality of queues, one queue for each node; and
starting each of the plurality of apps according to the queue, wherein starting each of the plurality of apps according to the queue further comprises each of the plurality of apps configuring a Line Card ("LC").

2. The method of claim 1, wherein starting each of the plurality of apps according to the queue further comprises each of the plurality of apps configuring a compute node.

3. The computer-readable medium of claim 1, wherein queuing the plurality of apps for execution based on the resource needs of each of the plurality of apps comprises forming a plurality of queues, one queue for each node.

4. The method of claim 3, wherein the processing capability of the LC's is a predetermined value for each LC.

5. The method of claim 3, wherein the processing capability of the LC's is determined based on feedback from each LC.

6. A system for configuring a switch, comprising:
a processor; and
a memory storage device for storing instructions coupled to the processor;
the processor responsive to the instructions of the program, operable for:
receiving a configuration file comprising the configurations for a plurality of apps;

determining the resource needs of each of the plurality of apps;
queuing the plurality of apps for execution based on the resource needs of each of the plurality of apps, wherein queuing the plurality of apps for execution comprises:
   determining, based on the resource needs of each of the plurality of apps and a system load, at least two of the plurality of apps that are to be executed in parallel, wherein determining that at least two of the plurality of apps that is to be executed in parallel comprises determining that the resource needs of the at two of the each of the plurality of apps is less than the system load,
   determining an order of execution of the plurality of apps, and
   queuing the plurality of apps in the queue for execution in the determined order, wherein queuing the plurality of apps comprises queuing the at least two of the plurality of apps for execution in parallel; and
starting each of the plurality of apps according to the queue.

7. The system of claim 6, wherein starting each of the plurality of apps according to the queue further comprises each of the plurality of apps configuring a compute node.

8. The system of claim 6, wherein starting each of the plurality of apps according to the queue further comprises each of the plurality of apps configuring a Line Card ("LC").

9. The system of claim 7, wherein queuing the plurality of apps for execution based on the resource needs of each of the plurality of apps comprises forming a plurality of queues, one queue for each node.

10. The system of claim 7, wherein queuing the plurality of apps for execution based on the resource needs of each of the plurality of apps comprises determining resource needs based on each of the plurality of apps and the processing capability of any LC's associated with each respective app.

11. The system of claim 10, wherein the processing capability of the LC's is a predetermined value for each LC.

12. The system of claim 10, wherein the processing capability of the LC's is determined based on feedback from each LC.

13. A computer-readable medium that stores a set of instructions which when executed perform a method executed by the set of instructions comprising:
receiving a configuration file comprising configurations for a plurality of apps;
determining resource needs of each of the plurality of apps;
queuing in a queue the plurality of apps for execution based on the resource needs of each of the plurality of apps, wherein queuing the plurality of apps for execution comprises:
   determining, based on the resource needs of each of the plurality of apps and a system load, at least two of the plurality of apps that are to be executed in parallel,
   determining an order of execution of the plurality of apps, and
   queuing the plurality of apps in the queue for execution in the determined order, wherein queuing the plurality of apps comprises queuing the at least two of the plurality of apps for execution in parallel, and queuing the plurality of apps for execution based on the resource needs of each of the plurality of apps comprises determining resource needs based on each of the plurality of apps and the processing capability of any LC's associated with each respective app; and
starting each of the plurality of apps according to the queue, wherein starting each of the plurality of apps according to the queue further comprises each of the plurality of apps configuring a Line Card ("LC").

14. The computer-readable medium of claim 13, wherein queuing the plurality of apps for execution based on the resource needs of each of the plurality of apps comprises forming a plurality of queues, one queue for each node.

15. The computer-readable medium of claim 13, wherein the processing capability of the LC's is a predetermined value for each LC.

16. The computer-readable medium of claim 13, wherein determining that at least two of the plurality of apps that is to be executed in parallel comprises determining that the resource needs of the at two of the each of the plurality of apps is less than the system load.

17. The computer-readable medium of claim 13, wherein starting each of the plurality of apps according to the queue further comprises each of the plurality of apps configuring a compute node.

18. The method of claim 1, wherein determining that at least two of the plurality of apps that is to be executed in parallel comprises determining that the resource needs of the at two of the each of the plurality of apps is less than the system load.

19. The system of claim 6, wherein determining that at least two of the plurality of apps that is to be executed in parallel comprises determining that the resource needs of the at two of the each of the plurality of apps is less than the system load.

* * * * *